(12) United States Patent
Sturt (10) Patent No.: US 6,722,719 B1
(45) Date of Patent: Apr. 20, 2004

(54) APPARATUS FOR STORING MEDIA DISCS

(75) Inventor: Alan Sturt, West Bloomfield, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/261,351

(22) Filed: Oct. 1, 2002

(51) Int. Cl.⁷ .................................................. B60R 7/06
(52) U.S. Cl. ..................... 296/37.8; 224/567; 206/308.1
(58) Field of Search ............................... 296/37.1, 37.8, 296/37.12, 37.13, 37.14, 37.15, 37.16, 97.1, 97.5; 206/308.1; 224/567

(56) References Cited

U.S. PATENT DOCUMENTS

| | | |
|---|---|---|
| 3,856,192 A | 12/1974 | Nelson |
| 4,180,299 A * | 12/1979 | Tolerson ..................... 312/242 |
| 4,441,641 A | 4/1984 | Thompson |
| 4,729,479 A | 3/1988 | Wallin |
| 5,285,941 A | 2/1994 | Herrera |
| 5,495,971 A | 3/1996 | Holliday |
| D372,623 S | 8/1996 | Alves et al. |
| 5,590,827 A | 1/1997 | Nimpoeno |
| 5,653,364 A | 8/1997 | Eskandry |
| 5,762,246 A | 6/1998 | Drew |
| 6,024,400 A | 2/2000 | Donoughe et al. |
| 6,186,321 B1 | 2/2001 | Eskandry |
| 6,206,260 B1 * | 3/2001 | Covell et al. ................ 224/539 |
| D453,728 S | 2/2002 | Hassett |

FOREIGN PATENT DOCUMENTS

JP        4/71941     * 4/1992

* cited by examiner

Primary Examiner—Joseph D. Pape
(74) Attorney, Agent, or Firm—Bill C. Panagos (57) ABSTRACT

A storage device for a vehicle that has a housing installed in a vehicle that defines a recess. Positioned within the housing is a panel adapted to receive at least one portable media disc. The panel is pivotably mounted in the recess of the housing. Additionally, the storage device is covered by a door that is pivotable relative to the housing. In one embodiment, the storage device has a plurality of panels that are pivotably mounted in the recess of the housing. The panels can also be adapted to receive more than one disc. To retain the discs in a locked position, the storage device includes a plurality of notches formed therein. Each panel can also have a detent formed thereon. Each of the detents is adapted to engage one of the notches such that a releasable locking engagement is made.

18 Claims, 13 Drawing Sheets

APPARATUS FOR STORING MEDIA DISCS

BACKGROUND OF THE INVENTION

This invention relates in general to a storage device for media in a vehicle. More particularly, the media storage apparatus is integrally mounted with a vehicle console.

Many vehicles today have audio systems that incorporate AM/FM stereo systems with compact disc (CD) players. Some CD players are capable of storing and playing multiple discs. Recently, there has also been an emergence of audio/video players installed in vehicles that play Digital Versatile Discs (DVD). A DVD is an optical disc storage technology that is similar to that of CDs, but generally has a larger capacity and speed. CDs and DVDs can contain audio, video, data or a combination of the three. Additionally, it is common in vehicles to have power supply sources for other accessories, such as video game machines and laptop computers. Both gaming devices and laptops are capable of using CD or DVD discs that contain music, audio, video or data programs. Both CD and DVD players, regardless of the device such players are used in, use discs that are substantially similar in size and shape, that being circular and having approximately a 12 cm diameter. CDs and DVDs are generally packaged with some type of protective case, such as a jewel case or movie box. The size of a typical jewel case is approximately 14 cm by 12.5 cm by 1 cm. Most jewel cases have a base that supports the disc and an upper surface that covers the disc. A portion of the upper surface includes a pivotable cover that complements the base. The pivotable cover generally only is a portion of the upper surface of the jewel case such that the non-pivoting portion of the upper surface provides a location where the user can grasp the cover while opening the case.

It is common for passengers in a vehicle to desire access to multiple CDs and/or DVDs while being passengers in the vehicle. When multiple discs are carried into a vehicle for transport therewith, the cases can occupy a substantial amount of space. Additionally, if a driver is the only passenger in the vehicle, it can be cumbersome to find the required case, open the case, remove the disc and insert the disc into a player, all while the driving and attempting to keep attention on the road. Therefore, it is often more convenient to transport the discs outside of the larger sized cases. For this purpose, there are many products that allow a user to remove discs from their protective jewel cases, place the discs in a carrier, often with a plurality of other discs, and transport the carrier. Many of these carriers are designed with individual pockets so that each disc is at least partially protected from the elements as well as the other discs in the carrier. Because the playing surface of CDs and DVDs is sensitive to scratching, dirt, and fingerprints, the carriers are usually adapted to prevent the sensitive playing surface from being thusly affected. Such carrier devices reduce the space that is required to carry multiple discs and allows for easier access thereto.

A disadvantage of these portable carriers is that they occupy valuable space in the passenger compartment of the vehicle. Also, they clutter the area where passengers would sit in the vehicle and thus the carriers have to be moved whenever someone other than the driver is in the vehicle. Because the carriers are movable, they also require the driver to take his eyes off of the road in order to locate the carrier in the passenger compartment while driving. Also because disc carriers are so portable, the disc carriers are very susceptible to theft, especially if the carriers are visible through the vehicle windows. Some carriers have been adapted to affix to a visor, however, those carriers have limitations as well. First, they can wrap around the entire visor making it difficult for someone using the visor to access a vanity mirror or other accessories positioned on the visor. Additionally, most of these carriers leave at least a portion of the discs exposed. Because most discs are reflective, sunlight entering the vehicle can be brightly reflected into the driver's eyes, or into oncoming traffic. Also, the carriers are only temporarily attached to a visor using straps or Velcro™. Therefore, they can slip relative to the visor when the driver or another passenger is removing or replacing a disc therein.

For these and other reasons, it would be advantageous to implement a disc carrier device that allows the driver to keep focused on the road while knowing the exact location of the disc carrier. It is further advantageous for the carrier to not interfere with other accessories in the car, such as vanity mirrors, console controls, and even the passenger seat. Also, it would be beneficial if the carrier were able to carry a plurality of discs while protecting each disc from the other discs. There is also a need to have a disc carrier that remains relatively stable when the discs are being accessed and replaced. Finally, it would be helpful to have a carrier that protects discs from the elements as well as protecting drivers from having light reflected into their eyes by the discs.

SUMMARY OF THE INVENTION

This invention relates to a storage device for a vehicle that has a housing installed in a vehicle that defines a recess. Positioned within the housing is a panel adapted to receive at least one portable media disc. The panel is pivotably mounted in the recess of the housing. Additionally, the storage device can be covered by a door that is pivotable relative to the housing. In one embodiment, the storage device has a plurality of panels that are pivotably mounted in the recess of the housing. The panels can also be adapted to receive more than one disc. To retain the discs in a locked position, the storage device includes a plurality of notches formed therein. Each panel can also have a detent formed thereon such that each of the detents is adapted to engage one of the notches so a releasable locking engagement is made.

In another embodiment, a storage device for a vehicle includes a housing that is installed in a vehicle passenger compartment. A door panel is pivotably mounted to cooperate with the housing. The door can be pivotable between a closed and open position. A plurality of disc panels are each independently pivotably mounted to the door such that each panel is accessible only when said door is moved to the open position. Each panel is adapted to receive a portable media disc. In a preferred embodiment, each panel is adapted to receive a plurality of discs.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
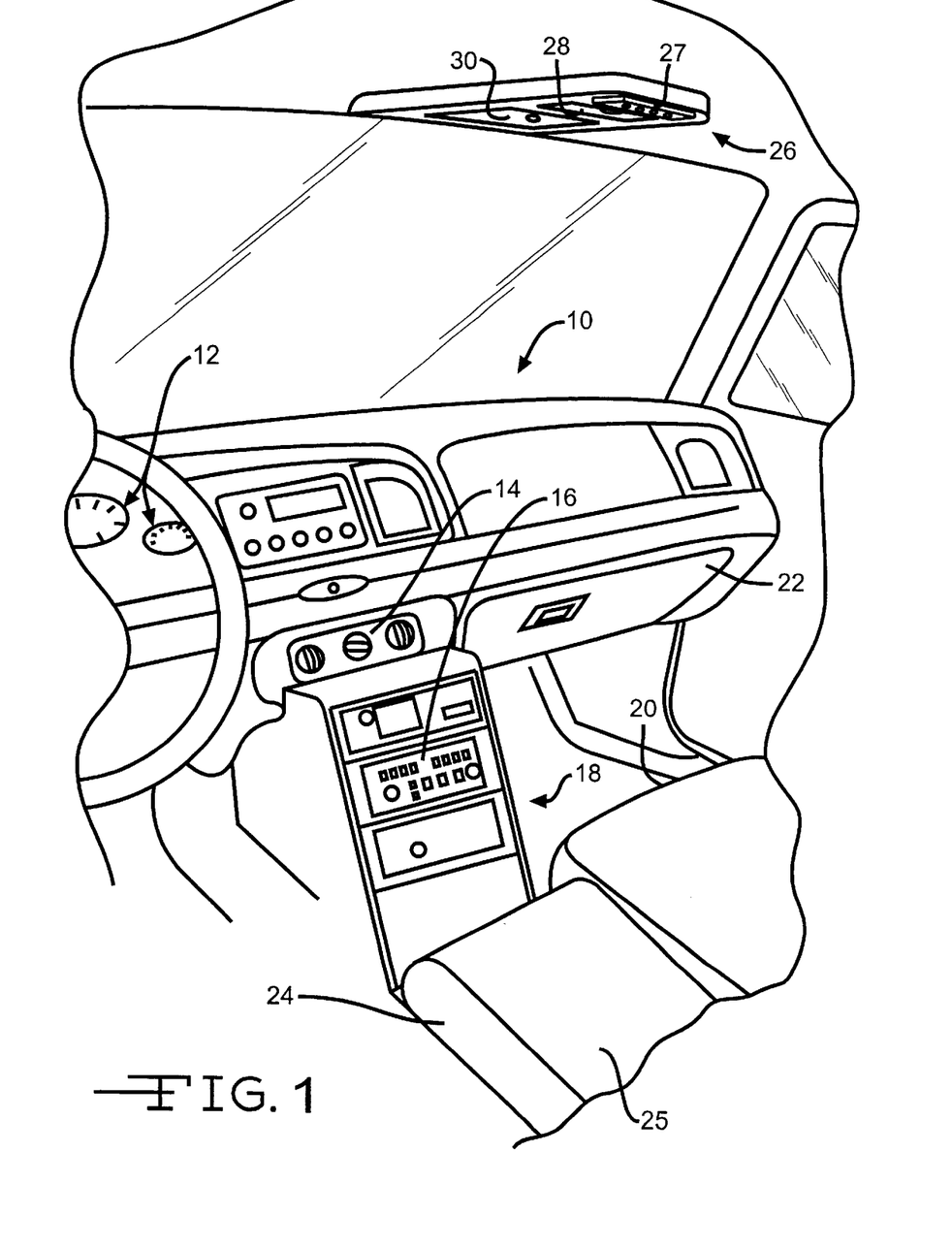
FIG. 1 is a view of the interior of the passenger compartment of a vehicle having a storage device according to the present invention.

Referring now to the drawings, there is illustrated in FIG. 1 the interior passenger compartment of a vehicle. Indicated generally at 10 is an instrument panel or dashboard. Positioned within the instrument panel 10 are visual gauges 12 for the driver's convenience, and temperature and climate controls 14. Other controls, storage compartments and stereo controls 16 can be positioned on a lower console 18. Also located within the passenger compartment is a glove box 22, and a passenger seat 20. Positioned between the passenger seat 20 and a driver seat (not shown) is a storage compartment 24 that has a lid 25 that can serve as an armrest. The storage compartment 24 can be accessed by lifting the armrest lid 25. An overhead console is also shown, indicated generally at 26. The overhead console 26 can contain various controls 27, such as a garage door opener, climate controls, etc. The overhead console 26 can also contain storage compartments such as a sunglasses case 28, or portable media storage 30 as is the focus of the invention.

Figure 2:
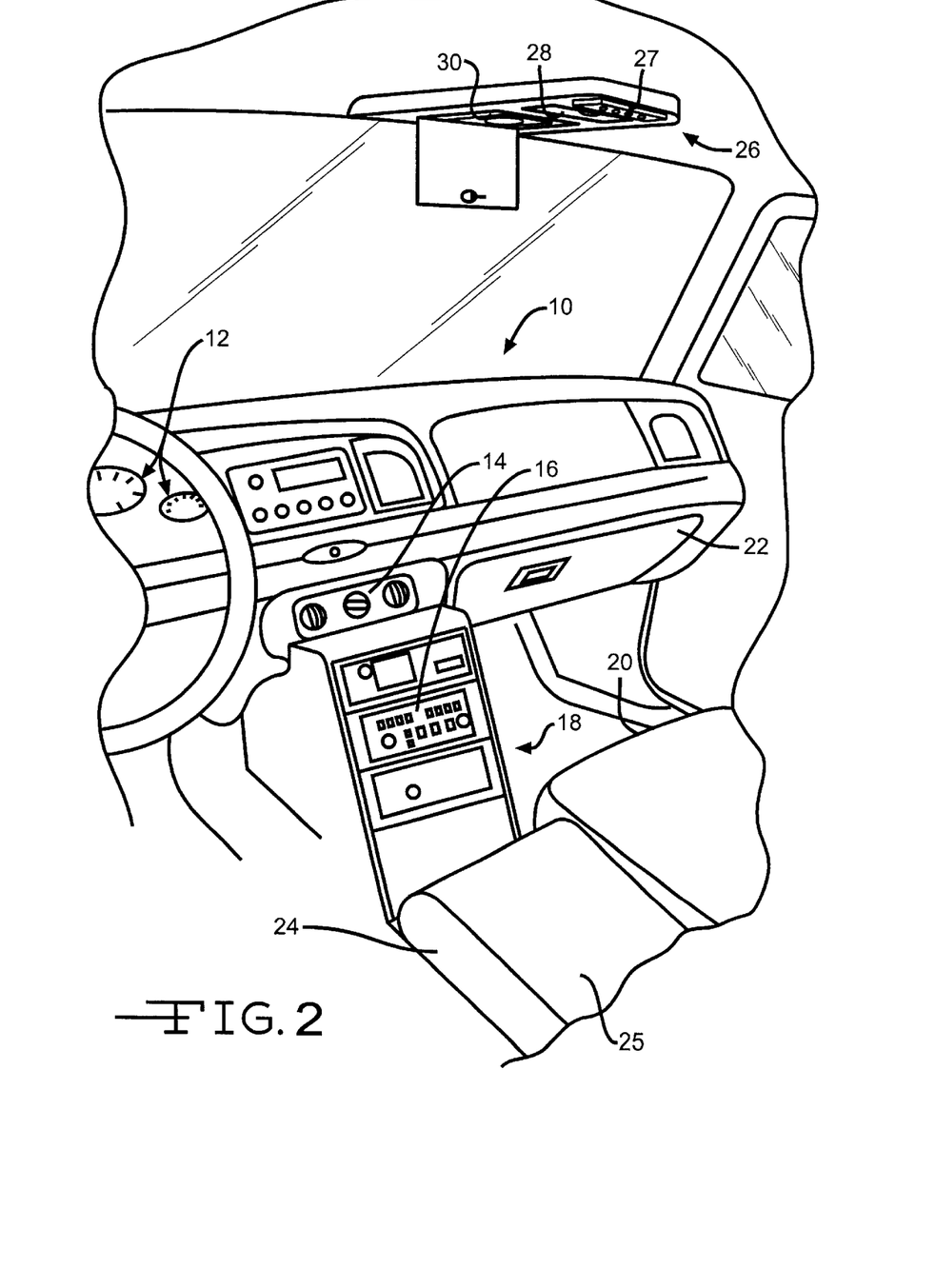
FIG. 2 is a view of the vehicle interior of FIG. 1 wherein the storage device of the present invention is in an opened position.

Illustrated in FIG. 2 is the vehicle interior as shown in FIG. 1 with the storage device 30 for portable media in an open position. Although the invention is shown as being positioned in an overhead console 26, it should be understood that the media storage device 30 can be located in an armrest storage compartment 24, as will be described in greater detail below, with respect to FIG. 10. The media storage device 30 could also be positioned in a glove box 22, other floor console, quarter panel trim or in a door panel. The storage device 30 could be positioned horizontally, vertically, or at any suitable angle. Additionally, a separate storage compartment could be positioned for direct access by passengers in a rear seat, such as in a second overhead console, floor console, door panel, or quarter trim panel. Alternatively, since many multi-disc CD players are installed in the trunk of a vehicle, the storage device of the present invention could be positioned in the trunk or rear portion of a vehicle.

Figure 3:
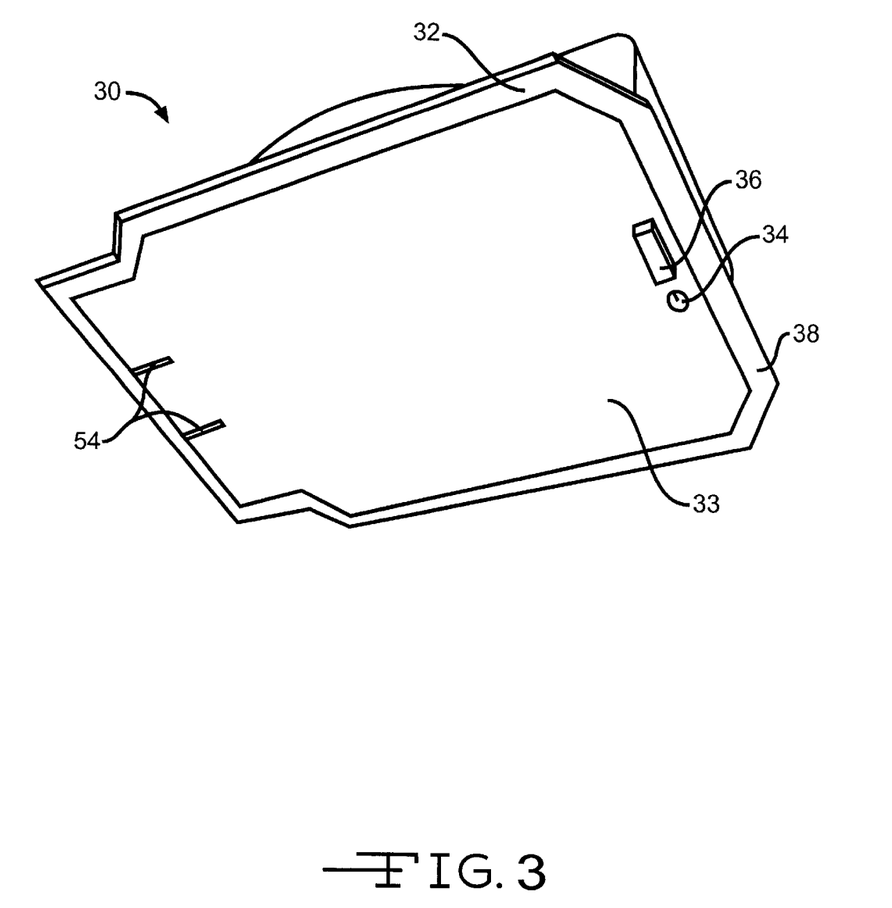
FIG. 3 is an enlarged perspective view of an overhead mounted storage device in a closed position according to the present invention.

For purposes of explanation, the illustrated embodiment is described as being positioned in an overhead console 26. However, as explained above, the storage device 30 can be positioned at any suitable location in the vehicle. Illustrated in FIG. 3 is the storage device 30 for portable media, in a closed position. Portable media includes any type of memory disc such as music compact discs (CD), digital versatile discs (DVD), computer game discs, or computer program/data discs. The generic term disc is used herein to incorporate these discs as well as any other type of portable memory disc. The storage device 30 has a housing 32 and an optional door 33. In a preferred embodiment, the door 33 is pivotably mounted with the housing 32 in order to protect the discs 42. Additionally, the door 33 or the housing 32 can be optionally configured to have a locking mechanism 34 to prevent access to the device 30 when the driver is away from the vehicle to prevent theft or unauthorized use of the discs 42. It is preferred that the door 33 also have a latching mechanism 36 that latches with the housing 32 such that the door 33 does not open with vibrations and bumps encountered during ordinary driving. The housing 32 is preferably sized and shaped so as to fit into an overhead console 26 without obstructing the view of the driver. The housing 32 can have a trim surface 38 that lays flush with the overhead console 26. The walls of the housing 32 can define a recess 40 having a shape that is compatible with the console 26 with which it can be installed. The housing, therefore, has a pair of opposed longitudinal sides and a pair of opposed lateral sides, preferably with the longitudinal dimension being longer than the lateral dimension thereby defining the housing recess 40. For use with an overhead console 26, it is preferred that the recess 40 of the housing 32 be oriented such that the recess 40 faces the interior of the passenger compartment. The device 30 is preferably sized such that the housing 32 can accommodate a plurality of discs 42 as well as disc panels 44 (described below). The housing 32 is preferably positioned in the upper console 26 and ceiling of the vehicle and fastened therewith. The positioning of the housing 32 should be such that the device 30 can be conveniently accessed by the driver or passenger of the vehicle while the vehicle is in operation.

Figure 4:
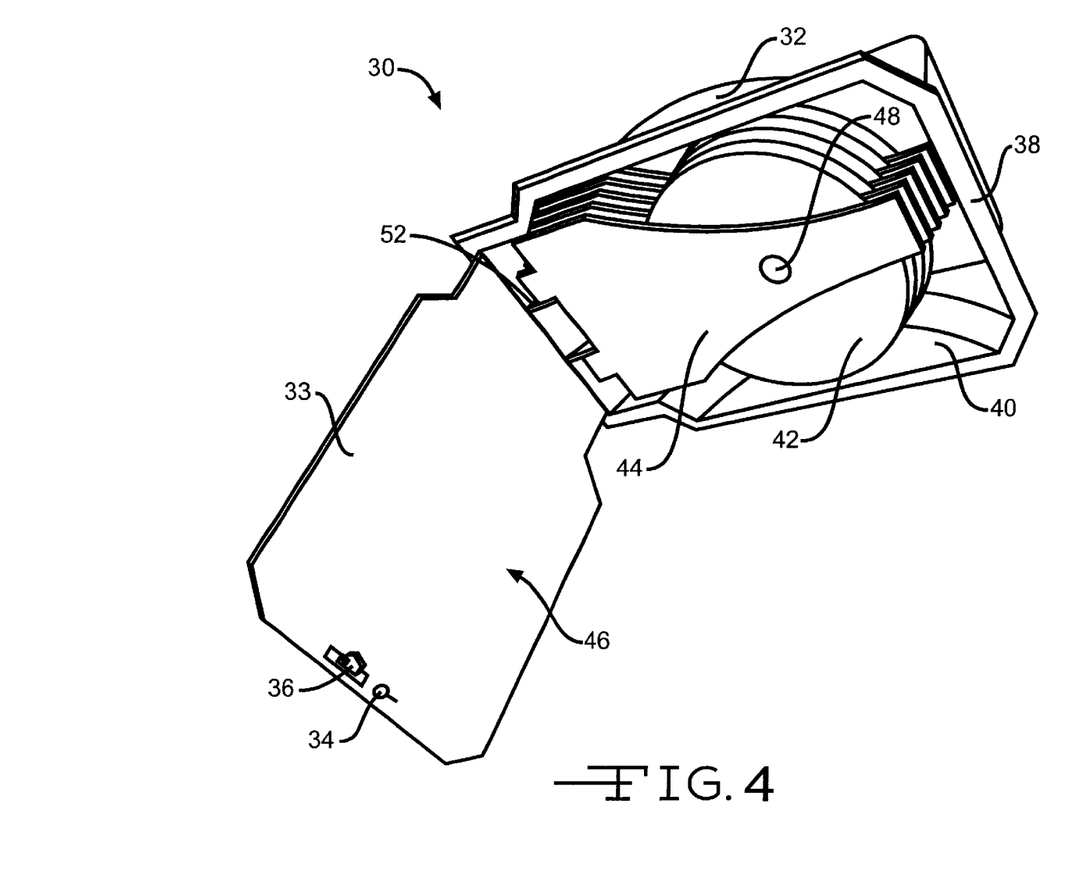
FIG. 4 is a perspective view of the device shown in FIG. 3 in an opened position.

Illustrated in FIG. 4 is an enlarged view of the disc storage device 30 with the door 33 in an open position. Seen on the inner surface 46 of the door 33 are the latch mechanism 36 and the lock mechanism 34. Both preferably have components that correspond to respective mating components on the housing 32. Positioned within the housing 32 are a plurality of discs 42. The discs 42 are preferably releasably attached to a plurality of disc panels 44. Most CDs and DVDs have an aperture 48 formed through the center of each disc 42. A hub 50 is formed on the disc panels 44 that include a widened base for frictionally engaging the central aperture 48 of the disc 42. The disc can be released from the disc panel 44 by applying pressure to the hub 50 causing the disc 42 to separate from the hub 50 and therefore from the disc panel 44. Each disc panel 44 can have a single hub 50 or multiple hubs formed thereon. In a preferred embodiment, each panel 44 has two hubs, with each hub 50 positioned on opposite faces of the panel 44, such that a disc 42 can be positioned on both sides of the disc panel 44 thereby increasing the capacity of the storage device 30. The disc panels 44 can be pivotably attached to the housing 32 by any means. Preferably the pivots 52 are positioned on the same side as the door hinge 54 such that the disc panels 44 pivot similarly to the door 33. This would also allow for easier access to the discs 42 than if the pivots 52 were otherwise positioned. However, it should be understood that the pivots 52 could be positioned on a longitudinal side of the housing 32 such that the disc panels 44 pivot perpendicularly to the door panel 33, or on the opposite side of the door hinge 54.

Figure 5:
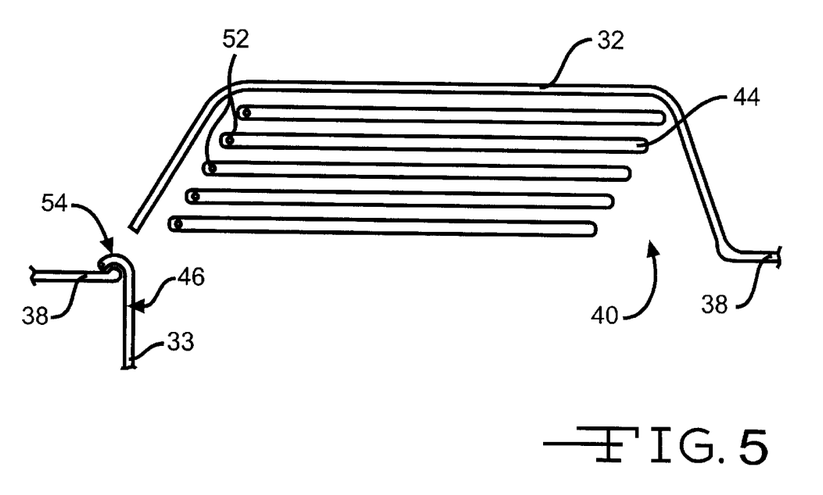
FIG. 5 is a side view of the device shown in FIG. 4.
Figure 6:
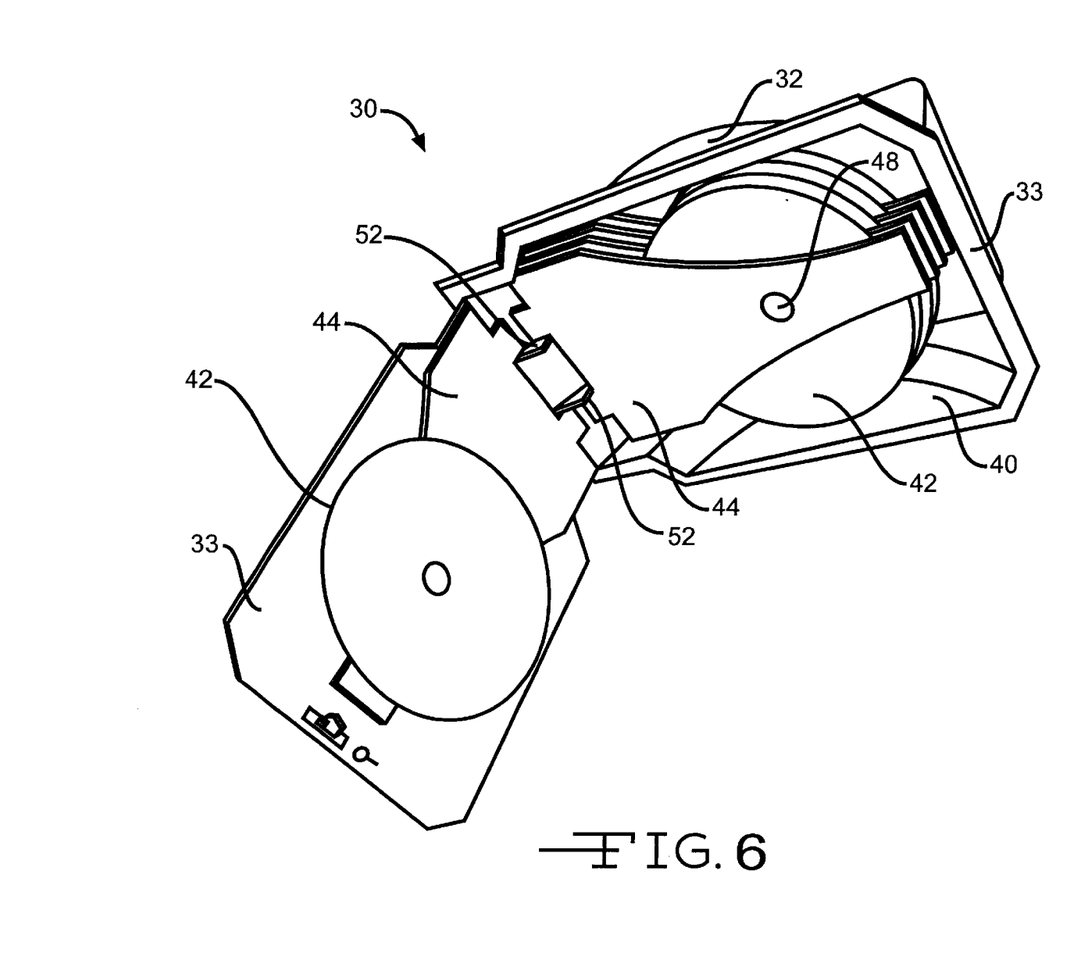
FIG. 6 is a perspective view of the device shown in FIG. 3 with a disc in an access position.
Figure 7:
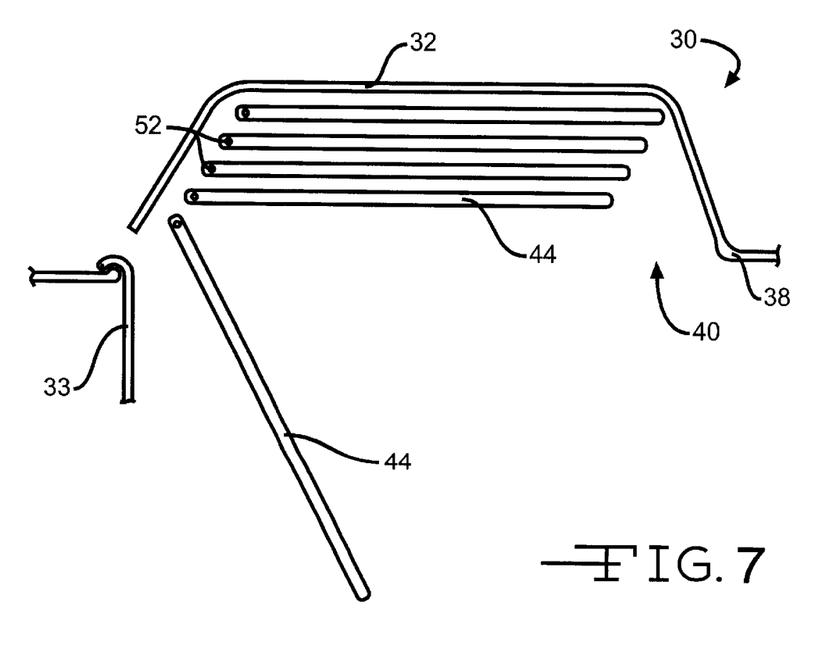
FIG. 7 is a side view of the device shown in FIG. 6.

Illustrated in FIG. 5 is a side view of the housing 30 and disc panels 44. No discs are shown in this view for purposes of simplicity, it should be understood that the disc panels are preferably adapted to receive a disc or discs. As with FIG. 4, the door 33 is in an opened position. It is preferred that the disc panels 44 remain in position when the door 33 is opened and remain locked until moved by the user, as will be described below. The door pivot 54 can be have any suitable hinge mechanism such that the door 33 and hinge 54 do not interfere with the motion of the disc panels 44 when they are moved. Additionally, it is preferred that each disc panel 44 be independently pivotable relative to the housing 32. In a first position, the disc panels 44 are generally parallel within the housing 32. It is preferred that the stack of disc panels 44 be staggered such that when the disc panels are moved into an access position (as seen in FIGS. 6 and 7), each panel 44 is in a position that is generally perpendicular to its locked initial position. Additionally, the staggered stacking of the plurality of disc panels 44 allows the user to access a disc panel 44 that is positioned higher than the lowest closed disc panel 44 directly without having to move each preceding disc panel 44 separately. For example, if the user wished to access the uppermost disc panel 44, the user can directly reach the upper disc panel 44 and release it (as well as simultaneously releasing all the preceding panels) without having to individually move each preceding disc panel 44. It should be understood, however, that the disc panels 44 could be oriented in a non-staggered position or have any other suitable configuration. In either embodiment, the disc panels 44 could also include a tab (not shown) to make it easier for the user to select a particular panel 44. The tab can be a tactile selection mechanism such that the user can identify or move certain disc panels 44 without having to shift his attention from the road.

Illustrated in FIG. 6 is the storage device 30 in an opened position with one of the disc panels 44 moved into an access position. From this position, the user can directly access the disc 42 positioned on the moved panel and remove it from the hub 50 or replace an unused disc panel 44 with a disc 42. The open position of a disc panel 44 is also seen in FIG. 7. No discs are shown in this view for purposes of simplicity, it should be understood that the disc panels are preferably adapted to receive a disc or discs.

Figure 8:
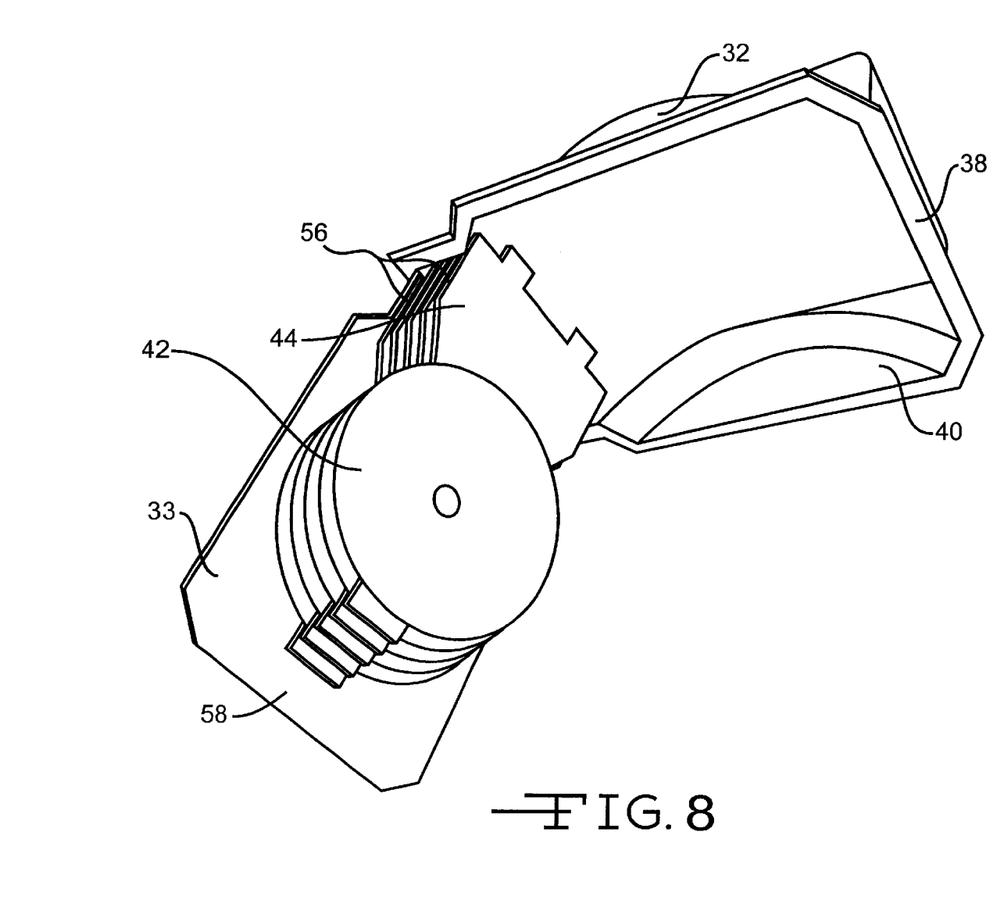
FIG. 8 is a perspective view of an alternate embodiment of the invention with the disc panels mounted upwardly pivotable on a door.
Figure 9:
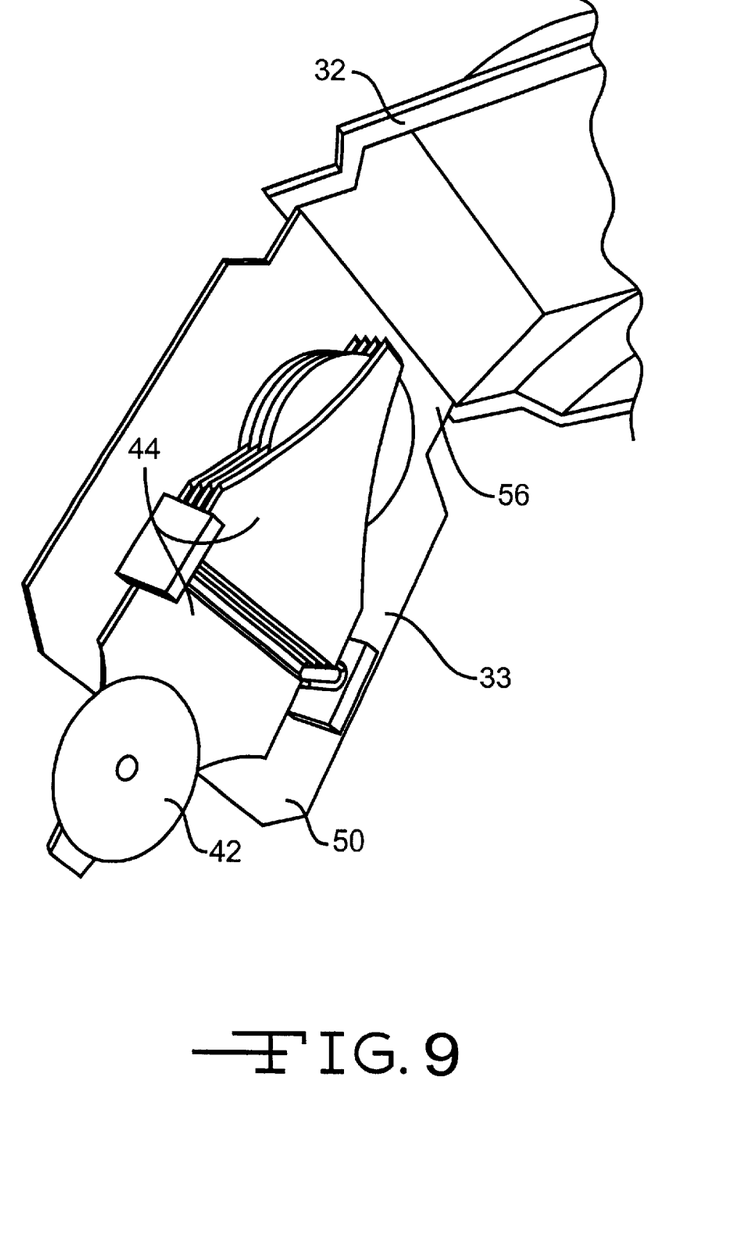
FIG. 9 is a perspective view of an alternate embodiment of the invention with the disc panels mounted downwardly pivotable on a door.

Illustrated in FIG. 8 is an alternate embodiment of a storage device 30 for discs 42. In this embodiment, the disc panels 44 are pivotably mounted on the door 33 such that when the door 33 is opened, the user can access the discs 42 without having to reach into the housing 32. As was described above with respect to the overhead positioned disc panels 44, each disc panel 44 preferably independently pivots relative to the door 33 such that each disc panel 44 can be accessed individually. The disc panels 44 can be attached at the upper end 56 (of the opened door) such that each disc panel 44 could be moved toward the housing 32 to access the subsequent disc panel 44. Alternatively, the disc panels 44 could be attached at the lower end 58 (of the opened door) such that each disc panel 44 could be moved away from the housing 32, as illustrated in FIG. 9.

Figure 10:
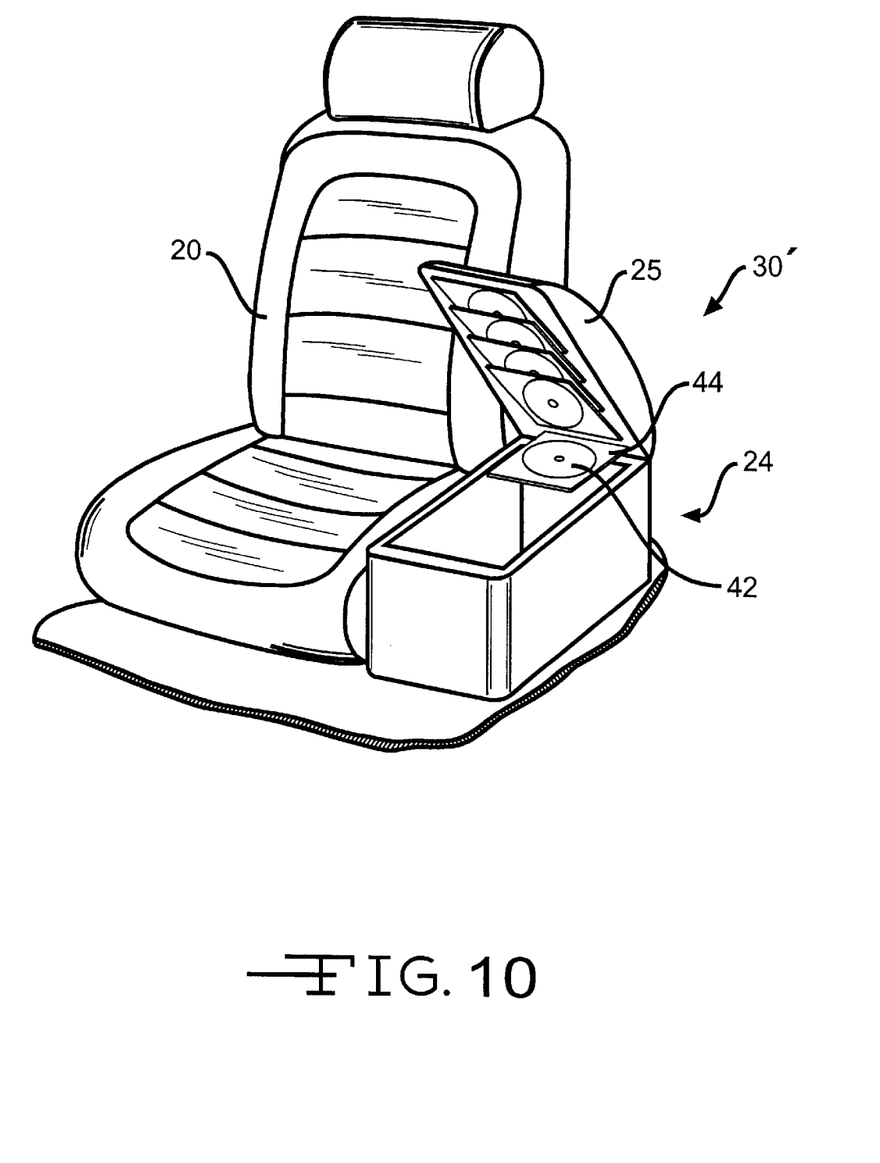
FIG. 10 is an alternate embodiment of the present invention with the disc panels mounted on a top-opening door.

Illustrated in FIG. 10 is an alternate embodiment of the present invention. In this embodiment, the disc storage device 30' is located within a floor console 24 that has an armrest component 25. The door 25 of the storage compartment 30' is typically used as an armrest for the driver and passenger while the vehicle is in operation. The top of the armrest 25 is comparable to the door 33 of the above-described embodiment and can be pivotably mounted with respect to the floor console 24. A plurality of disc panels 44 are preferably pivotably mounted on the door 25 or within the storage compartment 24. The disc panels 44 can be pivoted as specified with respect to the embodiment described above.

Figure 11:
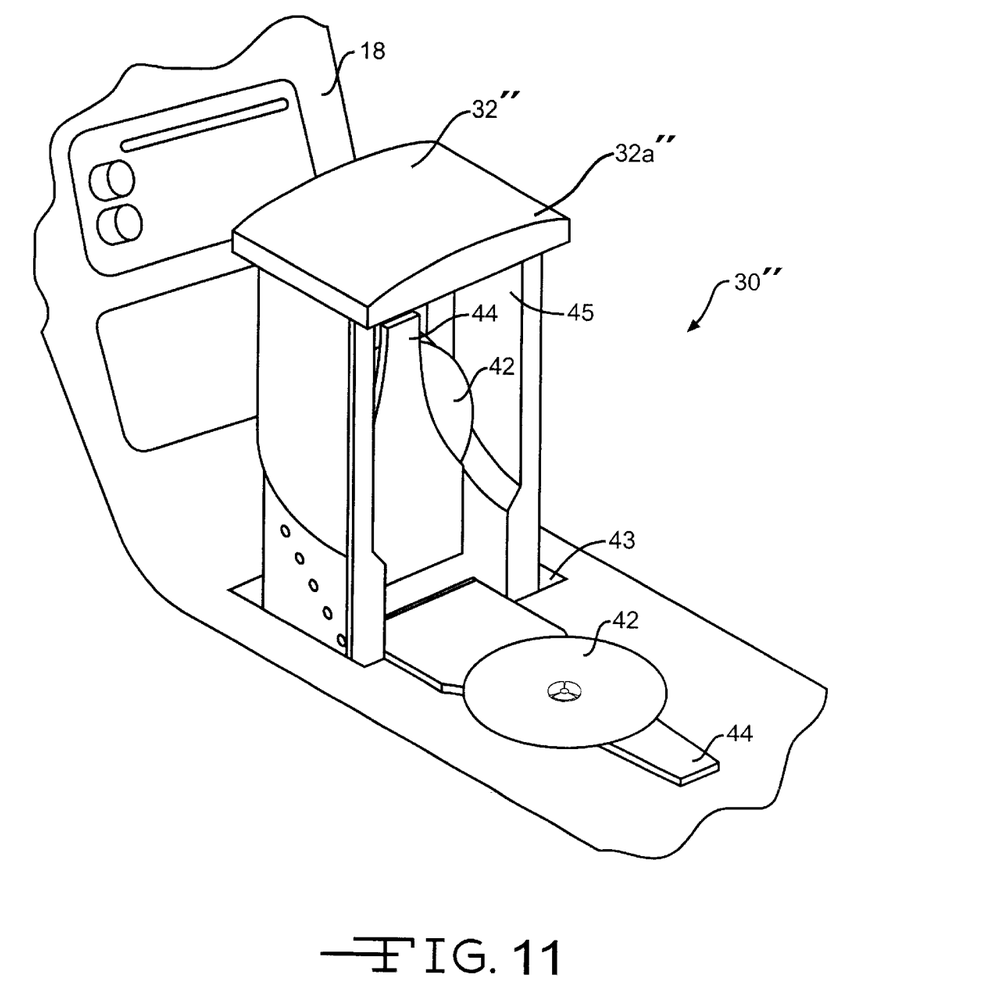
FIG. 11 is an alternate embodiment of the present invention with the disc panels mounted on a vehicle center console.

Illustrated in FIG. 11 is another embodiment of the invention. The storage device 30", is positioned in a center console 18 that is located between the driver and passenger seats 20. The housing 32" is preferably shaped to fit into a recess 43 formed in the console 18 and can be retractably positioned therewith. For example, the housing 32" could have a spring release assembly such that when the top of the housing 32a" is depressed, the release activates and the spring biases the housing 32" into a vertical position, as illustrated. The top of the housing 32a" can be depressed into the console 18 such that the housing 32" is out of view when not being accessed. Once in an open position, the housing 32" allows a user to access the contents therein. Preferably positioned within the housing 32" are a plurality of disc panels 44 and discs 42 in accordance with the invention.

Figure 12:
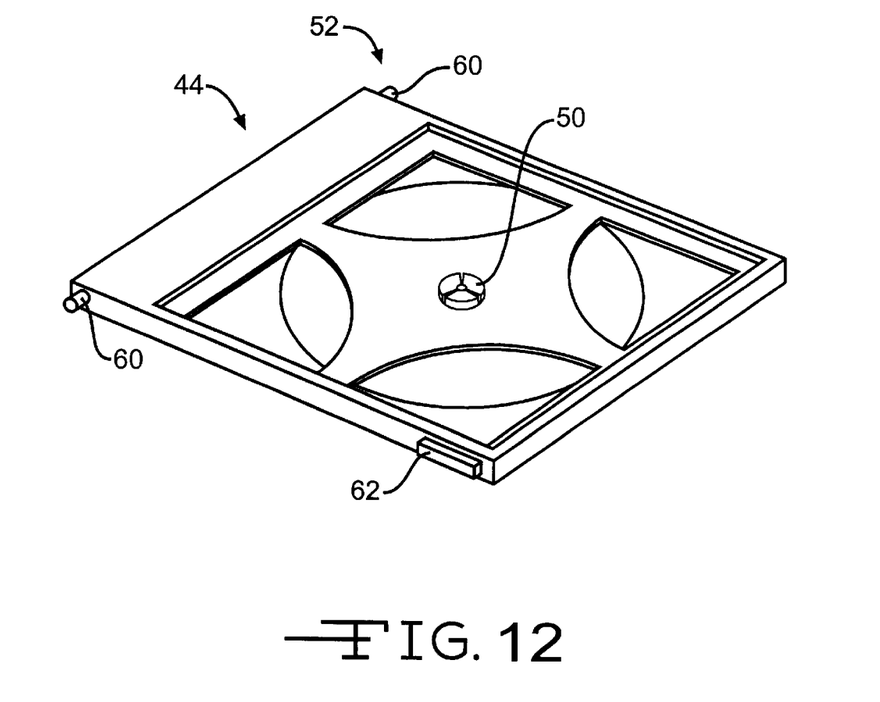
FIG. 12 is a perspective view of a first embodiment of a disc panel.
Figure 13:
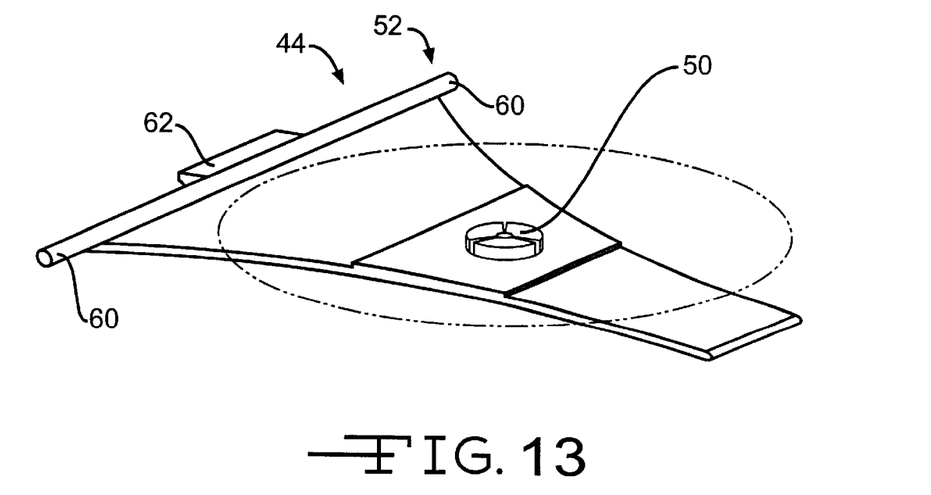
FIG. 13 is a perspective view of a second embodiment of a disc panel.

Shown in FIGS. 12 and 13 are two examples of the disc panel 44 used in accordance with the present invention. Both examples include a pivoting means 52, which can include a pin or rod 60 positioned at the pivot end of the disc panel 44. Both disc panels 44 also include a hub 50 (or hubs if the disc panel is designed to support more than one disc, as described above). It should be understood that the disc panels 44 shown in FIGS. 12 and 13 can have the generally square or generally triangular shape as illustrated. However, any suitable shape other than those shown in FIGS. 12 and 13, such as triangular, cross-shaped, star-shaped, etc. could also be implemented in accordance with this invention. Alternatively, the disc panel 44 could comprise a sleeve such that there is merely a pocket attached to a pivot 52 that the disc 42 could be positioned and retained in. In such an embodiment, there would not be a hub design 50, but the disc 42 would sit between two pieces of material. Preferably at least one of the sides of the pocket would be made using a non-slip material. Similarly, in any of the embodiments of the disc panel 44 herein, the disc panels 44 are preferably made of a suitable material such that the panels 44 do not scratch or otherwise damage the playing surface of the discs 42. Typically, a plastic panel would be appropriate, however, a metal panel that is coated with cloth or some other nonabrasive surface could also be used with the present invention.

Figure 14:
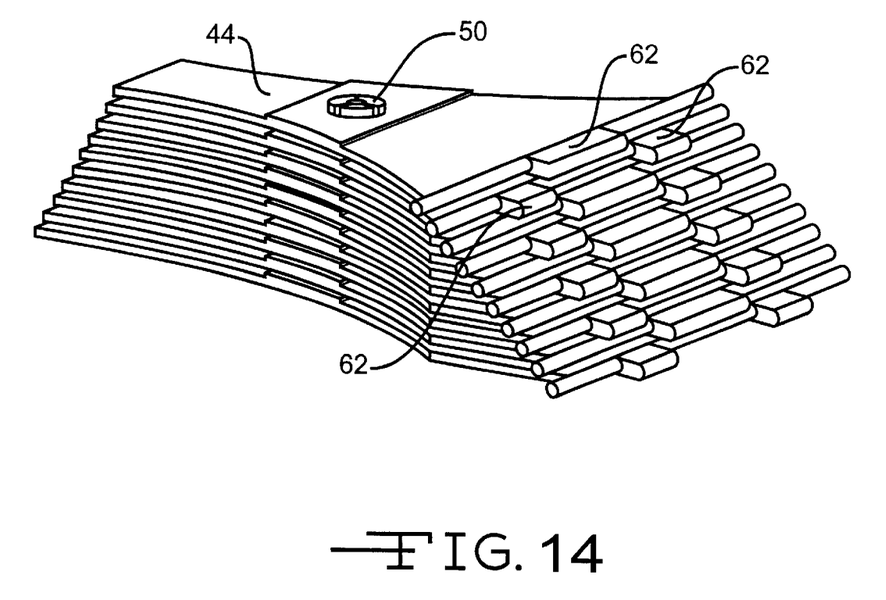
FIG. 14 is a perspective view of a plurality of disc panels having detent locking mechanisms.
Figure 15:
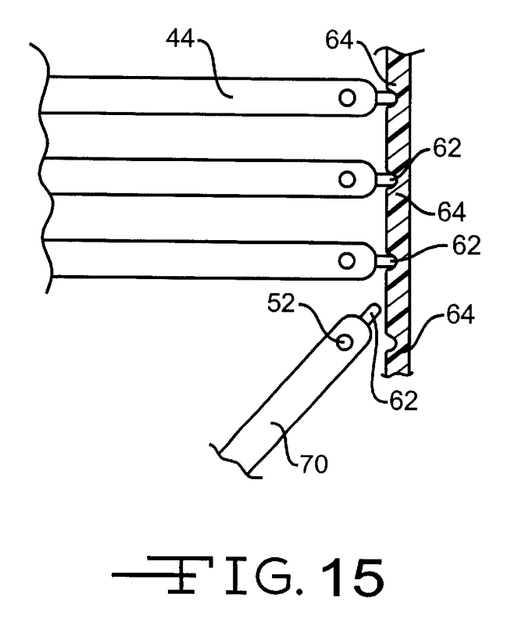
FIG. 15 is an enlarged side view of the detent-locking mechanism.

Both the disc panels 44 shown in FIGS. 12 and 13 have a detent locking mechanism design 62 that enables the disc panels 44 to remain in a locked position within the housing 32. It is preferred that the each detent 62 engages a corresponding notch 64 formed in the housing 32 thereby locking the disc panel 44 with the housing 32. When the panel 44 is moved out of the locked position, the detent 62 is displaced from the notch 64. When the disc panel 44 is replaced, the detent 62 could slightly resiliently deform until the detent 62 is completely within the notch 64. Then, the detent 62 will resile into its normal shape. Alternatively, an outwardly biasing detent spring could be positioned within the detent 62 so that when a force is applied to the disc panel, the spring allows the detent 62 to bias inwardly so that the disc panel 44 can be moved out of engagement with the notch 64. With the disc panel 44 shown in FIG. 12, the detent 62 can be positioned on any side surface of the generally square shaped disc panel 44. Due to the generally triangular shape of the disc panel 44 shown in FIG. 13, it is preferred that the detent 62 be on the pivot end of the panel 44. Although it is not required, the detents 62 for the disc panel 44 shown in FIG. 12 can be staggered, as is illustrated in FIG. 14. This could enable the discs 42 and disc panels 44 to be more closely positioned relative to each other without one panel 44 interfering with adjacent panels 44 during movement. In FIG. 15, the detent 62 and notch 64 locking mechanism design is shown in an enlarged view. A plurality of panels 44 are locked with the detents 62 and notches 64 in engagement. One of the panels 70 has been moved out of the locked position with the detent 62 displaced from the notch 64. The unlocked panel 70 can pivot freely about the pivot 52 until the detent 62 is moved back into engagement with the notch 64. It can be appreciated that the depth and shape of the notch 64 can be adapted to correspond to the length and shape of the detent 62. The notch 64 is preferably sufficiently deep and shaped such that the detent 62 does not displace from the notch 64 during normal driving due to gravity, bumps, vibration or other inadvertent motion.

Figure 16:
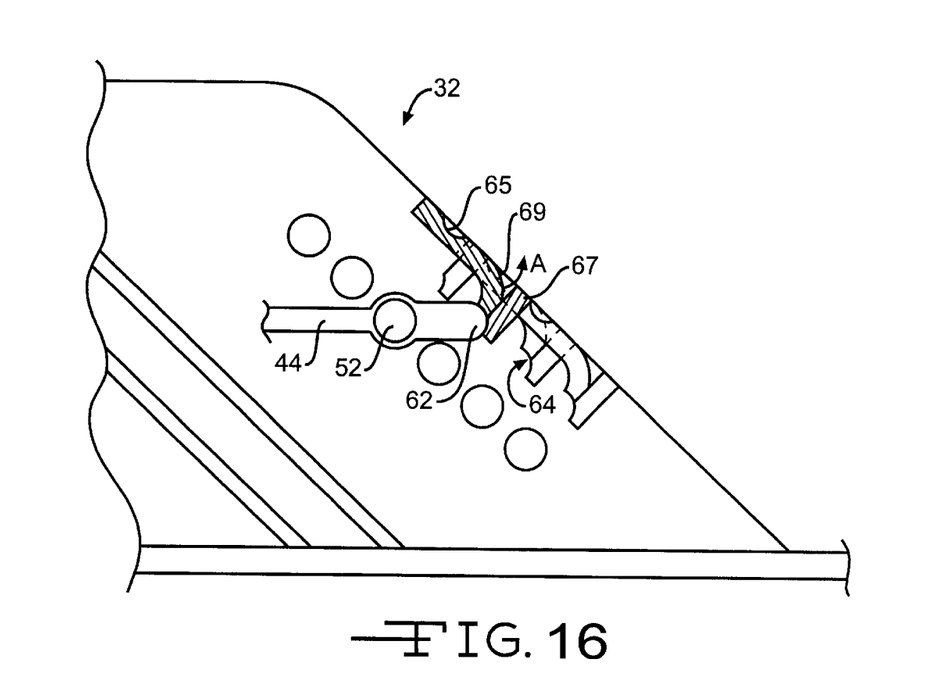
FIG. 16 is a detailed view of an alternate embodiment of the detent-locking mechanism.

Illustrated in FIG. 16 is another embodiment of the notch and detent design. A portion of a wall of the housing 32 is shown with a plurality of pivot points 52. A disc panel 44 is shown in a locked position. It should be understood that a plurality of disc panels could be positioned within the illustrated housing 32, however, only a single panel 44 is shown for purposes of explanation. Formed with the wall are a plurality of notch members 69 and stops 67. The notch members 69 and stops 67 are preferably formed from a resilient material with the stops 67 being slightly less resilient than the notch member 69. The ends of the stop 67 and notch member 69 preferably define a notch 64, similar to that shown in FIG. 15. However, when the disc panel 44 is moved by a user, the notch member 69 is able to slightly deform such that the notched tip of the notch member 69 flexes towards the housing 32 so that the detent 62 of the disc panel 44 can move as indicated by arrow "A". This will allow the disc panel 44 to more easily move away from the notch 64. When the disc panel 44 is returned to the locked position, the notch member 69 will again deflect slightly so the detent 62 can be moved until the detent 62 contacts the stop 67. Once in that position, the notch member 69 re-flexes or springs into engagement with the detent 62 thereby locking the disc panel 44 with the housing 32. In order to make the notch member 69 deflect more easily, it is preferred that the notch member have a reduced thickness portion 65 about which the notch member 69 can flex, thereby allowing the notch member to have the spring-effect described above. Although only a few notch members 69 and stops 67 are illustrated, it should be understood that any number of notch members 69 and stops 67 can be formed within the housing 32 in order to accommodate a plurality of disc panels 44.

Figure 17:
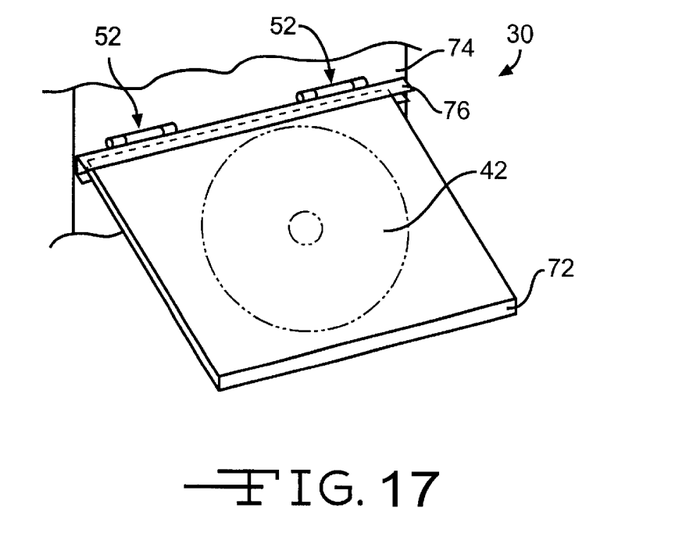
FIG. 17 is an alternate embodiment of the disc retention system.

Illustrated in FIG. 17 is an alternate embodiment of the invention wherein the storage device 30 does not have a disc panel. Instead, the storage device 30 is adapted to receive and support a plurality of jewel cases 72 (described above). The wall 74 of the storage device 30 has a pivot 52 affixed to a slot 76. The slot 76 is preferably sized and shaped to receive an edge of a jewel case 72 and retain the case therewith by frictional engagement. The jewel case 72 can be pressed into the slot 76 by the user such that the entire case 72 can pivot about the pivot point 52. For the user to access the disc 42, the entire case 72 could be removed from the slot 76. Preferably, however, the slot 76 could be sized such that only the non-moving portion of the jewel case cover (as described above) is supported therewith. This would allow the case 72 to be opened even while secured with the slot 76. As described above, the slot 76 could have a detent 62 formed thereon that would engage a notch 64 formed in the wall 74 of the housing 32. Similarly, this design could be adapted to work with the door supported embodiment, armrest lid embodiment, or any of the other embodiments described above.

Although the present invention has been described as being used with a motor vehicle, such as a car, it should be understood that the disc storage device could be installed in other vehicles such as boats, trucks, etc. Also, the storage device could be adapted to operate outside of a vehicle such as in a home or office environment or any other location where access to discs is required or advantageous. Additionally, the storage device could be adapted such that the entire device is removable from the vehicle such that the user can separately transport the device.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A storage device for a vehicle comprising:
   a housing defining a recess, said housing adapted to be installed in a vehicle; and
   a plurality of disc panels each adapted to receive at least one portable media disc;
   wherein each of the plurality of disc panels are independently pivotably mounted in the recess of said housing.

2. The storage device defined in claim 1 wherein the housing is covered by a door, said door being pivotable relative to said housing.

3. The storage device defined in claim 1 wherein each disc panel is adapted to receive more than one disc.

4. The storage device defined in claim 1 wherein the shape of each of said disc panels is generally square.

5. The storage device defined in claim 1 wherein the shape of each of said disc panels is generally triangular.

6. The storage device defined in claim 1 further comprising a plurality of notches formed in said housing;
   wherein said disc panels each have a detent formed thereon; and
   each of said detents is adapted to engage one of said notches in a releasable locking engagement.

7. The storage device defined in claim 6 wherein said detents are staggered relative to the detent of each preceding and subsequent disc panel.

8. The storage device defined in claim 1 wherein each of said plurality of disc panels is staggered relative to each preceding and subsequent disc panel.

9. The storage device defined in claim 1 wherein the storage device is installed in an overhead console.

10. The storage device defined in claim 1 wherein the storage device is installed in a floor console.

11. A storage device for a plurality of portable media discs comprising:
    a housing installed in a vehicle interior, said housing being accessible to the interior passenger compartment of the vehicle; and
    a plurality of independently pivotable disc panels mounted in said housing;

wherein each of said disc panels is adapted to receive at least one of said discs.

12. The storage device defined in claim 11 wherein the disc panels are adapted to receive a plurality of discs.

13. The storage device defined in claim 11 further comprising a door that is pivotably mounted to said housing.

14. The storage device defined in claim 11 wherein said housing is removable from said vehicle.

15. The storage device defined in claim 11 wherein said housing is installed in an overhead console.

16. The storage device defined in claim 11 wherein said housing is installed in a floor console.

17. A storage device for a vehicle comprising:

a housing installed in a vehicle passenger compartment; and a door panel pivotably mounted to cooperate with said housing, said door being pivotable between a closed and open position;

wherein a plurality of disc panels are each independently pivotably mounted to said door such that each disc panel is accessible only when said door is moved to the open position; and each disc panel is adapted to receive a portable media disc.

18. The storage device defined in claim 17 wherein each disc panel is adapted to receive a plurality of discs.

* * * * *